Sept. 10, 1968  R. J. PHILLPOTT ETAL  3,400,488
REMOTE CONTROL OF VEHICLES
Filed April 4, 1966  7 Sheets-Sheet 1

INVENTORS
ROBERT J. PHILLPOTT
HOLDEN M. BARRE, JR.
BY *Bealand Jones*
ATTORNEYS

3,400,488
REMOTE CONTROL OF VEHICLES
Robert J. Phillpott, 5922 Catina St., New Orleans, La. 70124, and Holden M. Barre, Jr., 714 Lake Ave., Metairie, La. 70005
Filed Apr. 4, 1966, Ser. No. 540,029
27 Claims. (Cl. 46—244)

The present invention relates to remote control systems, and particularly to systems for controlling the speed and direction of a free-running toy vehicle on a surface covered with electrically conductive and insulating material.

It is, of course, well known in the art to provide speed control mechanisms for toy vehicles, and such systems are readily available on the market today. However, most of the available systems are of the so-called "slot" type, utilizing slots, curbs, fences or the like to guide the vehicle along a track or raceway, the only control available being a variable speed control. Although these systems work well, the vehicles generally are confined to a single track, and thus do not provide the realism that a free-running vehicle could provide. There have been some attempts to overcome the limitations of the slot-type operation by providing crossovers and the like whereby the toy vehicles can be run either in the same slots or in separate slots. In order to cross from one slot to another, the vehicles are required to have a certain degree of steerability, but the fact that they are still limited to the particular tracks prevents a truly realistic operation.

An attempt has been made to provide a steerable vehicle by widening the parallel contact strips along which the car moves, the vehicle being provided with a pair of spaced contacts which remain on their respective strips as the car is moved from side to side. This arrangement gives a certain degree of steering, but the lateral motion of the vehicle is limited to a short distance on either side of the center of the track, and lateral motion across the track is out of the question. A further improvement in the art introduced a track made up of lateral strips of conductive material with interposed insulating strips, and this arrangement permitted freer motion for the toy vehicle. However, this arrangement required a "set" or grouping of strips for each vehicle, the respective vehicles responding only to signals received through their own sets of strips. This made necessary the inclusion of flywheels or the like in each vehicle to carry it over the dead spots on the track which occurred whenever a given vehicle was not in contact with its own set of strips. Where more than one vehicle was used on this type of track, the problem of overcoming the dead spots became acute, and thus the system was highly impractical.

In a recent attempt to overcome the difficulties encountered in previous lateral strip tracks, the use of means for simultaneously providing two different types of signals to the vehicle was introduced, one type of signal for providing power and controlling the speed, the other type of signal for controlling the steering. The first type of signal could be direct current and the second type an alternating current of variable frequency to control the degree of steering to the right or to the left, depending on the direction of frequency deviation from a set value. Alternatively, both types of signals could be alternating currents so that by using a number of different frequencies, several vehicles could be controlled at one time.

It has been found, however, that certain problems arise in such previous methods of simultaneously applying power and steering signals to a vehicle. Particularly, these problems occur in the areas of system efficiency, resulting in a higher cost and a greater weight of components such as transformers than is compatible with a useful system. If a low frequency steering control signal is used, the low inductance of the power transformer offers a low impedance to that control signal, thus requiring an expensive, low output impedance, high-power oscillator for the control signal source. If the frequency of the steering control source is raised to a value that will overcome the inductive loading of the power transformer, the capacitive reactance of the track surface becomes low enough to cause loading of the control oscillator, again requiring that a high-power oscillator be used. Further, if both speed control and steering control signals are applied simultaneously, the circuit arrangement in the receiving vehicle permits the drive motor current to flow through the tuned circuits used to separate the two control signals. Such a current can change the resonant frequency of the tuned circuit, thus reducing the degree of control available. Further, such an arrangement may require heavy inductive elements in the tuned circuits to enable them to handle the motor current, and this makes necessary a vehicle of such size as to be unsuitable for the purposes intended.

It is, therefore, an object of the present invention to overcome the disadvantages of the prior art by providing an efficient, inexpensive, highly reliable control means for the remote control of toy vehicles.

It is a further object of the present invention to provide a remote control system which utilizes a time-sharing concept to isolate power signals from control signals.

Another object of the present invention is the provision of means for transmitting control signals to a vehicle through a surface which does not require slots, curbs, fences or the like and which permits freedom of motion of the vehicle in any direction on the surface.

A further object of the present invention is the provision of a novel memory circuit for use in remotely-controlable toy venhicles, the memory circuit being particularly useful in systems utilizing a time-sharing concept whereby control signals may be retained and utilized during the period when power signals are being applied to the vehicle.

Another object of the present invention is the provision of a novel power supply circuit for use in remote control systems, wherein time delay means are incorporated to permit periodic injection of control signals to effect time-sharing.

An additional object of the invention is the provision of base and remote units for the generation and reception of power and control signals, both units operating on a time-sharing basis to provide separate power and control signals for a remote vehicle to regulate the speed and direction of the vehicle on a surface.

Briefly, the system of the present invention provides independent speed and direction signals for control of a vehicle, or several vehicles simultaneously, the vehicles obtaining both propulsion power and control signals through a surface which includes electrically conductive strips separated by insulating material. The conductive and insulating materials alternate and may be in the form of regular or random geometric shapes to form the desired surface configuration. Alternate conductive portions are electrically connected to one of two electrical feeder lines to which power and control signals are supplied. This surface requires no grooves, slots, rails or any other mechanical devices for providing vehicle guidance. A base control unit provides a gated power signal which may be derived from an alternating or direct current source by periodically disconnecting the source from the surface on which the vehicles travel. Timing means are provided which synchronize a trigger circuit with the power source to permit transmission of analog or digital control signals generated at the base unit during the period when the power source is disconnected from the surface. Where digital pulses are selected as the desired type of control signal, it is necessary to provide sequencing means such as a counter to insure that only one control signal at a time is transmitted to the track surface, and to establish a definite sequence of transmission where more than one control signal is to be used. Inasmuch as the system will usually require a speed and a direction signal for each vehicle on the track, there normally will be a number of control signal generators. The digital pulses, which are D.C. pulses, are amplitude-modulated to provide the required control function, and thus cannot be transmitted simultaneously.

Where analog signals of a single frequency are amplitude-modulated to control the remote vehicles, the requirements are similar to those of the D.C. pulses, for the remote vehicles will not be able to distinguish between various signals unless they are transmitted in a predetermined sequence.

If, however, each control signal generator produces an analog signal of a distinctive frequency, amplitude-modulated to produce the required control function, these signals can be distinguished by the remote vehicles through the use of tuned circuits responsive only to particular frequencies. This arrangement permits simultaneous transmission of all the control signals during each delay period of the power supply, and eliminates the requirement for sequencing means. Although the present disclosure is directed to a description of the foregoing types of control signals, it will be apparent that other combinations of signals can be used with the time-sharing concept described herein, and thus the invention is not limited to these specific embodiments.

The remote units carried by the free-running vehicles receive signals from the gated power supply and, during the delay periods in the power supply, from the several control generators. These signals are picked up from the track surface through contacts mounted on each vehicle in such a manner as to insure that at least one contact is touching each of a pair of the alternate conductive strips when the car is moving in any direction. Each remote unit includes timing means designed to open its memory circuits for reception of selected control signals occurring during the delay periods of the power pulses. The timing means used will vary with the type of control signals being generated at the base unit and with the particular vehicle in which it is mounted. Where digital control signals or signals of a single frequency are being transmitted in a predetermined sequence, the timing means in each vehicle is adjusted to open its associated memory circuit only during the time when control signals intended for that particular vehicle are being transmitted. Of course, the appropriate memory in the vehicle must be opened in order to assure that the proper function, i.e., speed or direction, will be controlled. A reset signal may be provided to establish synchronization of the base and remote units at the start of each control sequence, the timing means in each vehicle being based on the same reset signal.

Where multi-frequency tuned circuits are used to distinguish between the various control signals received by the remote units, the timer means in each vehicle are arranged to open their respective memory circuits during each delay period. In this case, reset signals are not required, for synchronization is provided by the start of the power pulse itself. The selected control voltages stored in the various memory circuits then actuate the steering control motor, regulate the speed of the drive motor, or perform any other control function that may be required. The memory circuits are so designed as to hold their values throughout the subsequent power cycle and until a new control value is transmitted. In order to avoid loading the control generators, means are provided in each of the remote vehicles to disconnect the vehicle drive motor from the track surface during transmission of the control signals.

Thus, the present invention provides means for remotely controlling a plurality of functions while at the same time providing power to remote units wherein the power and control signals are transmitted on a time-sharing basis. By the use of one of several types of control generators and the use of timing means appropriate thereto, any practical number of vehicles can be used on a given surface, each individually controlled as to one or more independent functions, and each capable of free motion on this surface.

Although this present invention is described in terms of a preferred embodiment as a control system for toy vehicles, it should be understood that additional uses of the system are within the scope of the invention as defined by the claims. For a more complete description of the structure and operation of the preferred embodiment of the system of the invention, reference should now be made to the following specification and the accompanying drawings in which:

Figure 1:
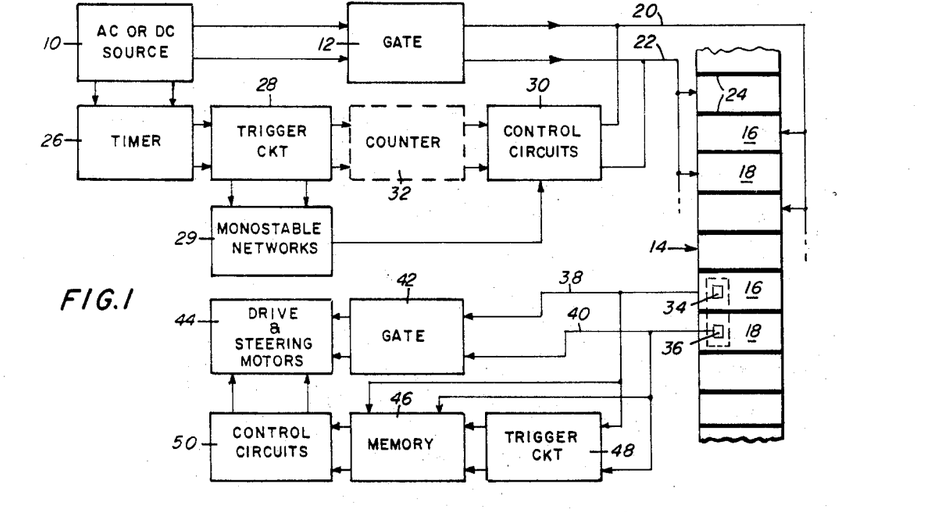
FIG. 1 is a general block diagram of the base and remote units of the present invention, the figure illustrating the type of surface with which the present system may be used.
Figure 2:
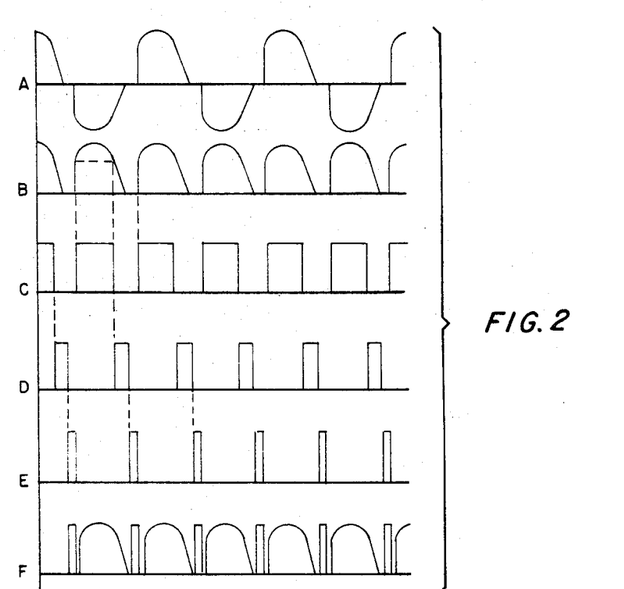
FIG. 2 discloses the wave forms of the power and control signals in the present system and illustrates the time-sharing concept.

Referring now to the block diagram of FIG. 1, it may be seen that the base unit comprises a source of AC or DC current 10, the type of source used being immaterial to the present invention and dependent only upon the available power. The output of the power supply is fed to a gating means 12 which produces a delay period between successive cycles of the power source. The duration of this delay period is not critical, but is determined primarily by the accuracy of the timing and trigger circuits which are used to sychronize the application of control signals to the remote unit. The more accurate the operation of the timer and trigger circuits, the shorter the delay time that may be used, the minimum time being determined by the response characteristics of the remote unit and thus by the required duration of the control signal. The output of gate 12 exhibits a wave form such as that illustrated in FIG. 2A when an AC power supply is used and similar to FIG. 2B when a DC power supply is used. These output signals are applied to a raceway or track surface 14 which may be in the shape of an oval or in any other desired configuration. The track is made up of a plurality of conductive strips 16 and 18 respectively energized by lead lines 20 and 22 from the gating circuit 12. The conductive strips which make up the track surface may, for example, be constructed of aluminum tapes affixed to a supporting base, although alternative constructions will be apparent to those skilled in the art. Interposed between adjacent strips is a suitable insulating means such as plastic tape 24, the insulation serving to insure that the only return path from line 20 to line 22 is through a mobile vehicle operating on the surface of the track. The portion of the circuit thus far described provides the propulsion power to the mobile unit and thus serves to operate the drive motor in the remote vehicle.

The control circuitry 30 is sychronized with the power supply by means of a timer 26 which senses the output voltage of the power supply and fires a trigger circuit 28 when the amplitude of the power supply reaches a predetermined value. The firing of the trigger circuit is illustrated in FIG. 2C as coinciding with the end of the delay period in the power pulse. When the output of the timer falls below the predetermined value at which it fires the trigger circuit, the trigger circuit 28 turns off, producing a pulse which turns on the first of a pair of monostable networks 29. This first stage stays on for a predetermined length of time and then turns off. The output of this stage of network 28 is illustrated in FIG. 2D. The second of the pair of monostable networks is turned on by the negative pulse produced when the first stage turns off, the output of this second stage serving to turn on selected control generators of the control circuit 30.

The output of the trigger circuit 28 also energizes a counter circuit 32, each pulse from the trigger circuit advancing the counter one step through its cycle. The output of the counter selects each of the control generators of the control circuit 30 in sequence, whereby each control generator in turn produces an output signal which is applied to lines 20 and 22 for transmission to the remote vehicle. Thus, if three control circuits and a reset are provided, the counter will include four steps, each step occurring during one delay period of the power supply so that a complete control cycle requires four half-cycles of the power supply. During the first delay period, the counter will energize a reset circuit and during the following three cycles will energize the three control generators in sequence.

The control signals carried by the conductive strips of track 14 are picked up by means of contacts such as those illustrated at 34 and 36 and are applied through lines 38 and 40 to the drive motor and the control circuitry to provide driving power and control signals to the remote units. The power signals are applied through gating circuit 42 to the drive motor, gate 42 serving to disconnect the drive motor from the track during the delay period when control signals are being transmitted. The control signals are applied through lines 38 and 40 to a memory circuit 46 which is opened for reception of control signals by means of a trigger circuit 48 which produces an output pulse for this purpose a predetermined length of time after the beginning of the power pulse. Trigger circuit 48 preferably is comprised of a pair of monstable networks, the first stage of which becomes conductive at the start of the reset pulse and remains conductive for a predetermined length of time. At the end of this predetermined time the first stage turns off and the second stage turns on, opening the memory circuit 46 for the duration of the control signal. The second stage then turns off and the memory circuit is closed. Control circuits 50 respond to the condition of the memory circuit 46 to produce suitable output pulses which regulate the speed of the drive motors, the position of the steering motors 44, or perform any other desired function.

The length of time during which the first stage of trigger circuit 48 remains conductive is dependent upon the particular control circuit with which it is associated, and thus serves to synchronize the control-responsive circuitry of each remote unit with its respective control generators in the base unit. Thus, for example, if the control circuit 50 is to respond to the third control generator of control circuit 30, the first stage of trigger circuit 48 will be turned on by the reset signal and will remain on through three half-cycles of the power supply before turning off to permit the second stage to turn on and open the memory. The memory circuit will then receive the output of the third control generator and store it for use by the control circuit 50. Of course, where a multiple frequency control circuit is used, and all the control signals are applied to track 14 during each delay period, the trigger circuit 48 will respond to the beginning of each power signal to provide the appropriate timing and synchronization. FIG. 2F illustrates the result of the time-sharing concept, showing a control signal interposed between each half-cycle of a direct current power supply. These control signals may be DC signals of varying amplitude, AC signals of varying amplitude, or may be a combination of a number of different frequency control signals superimposed upon one another.

Figure 3:
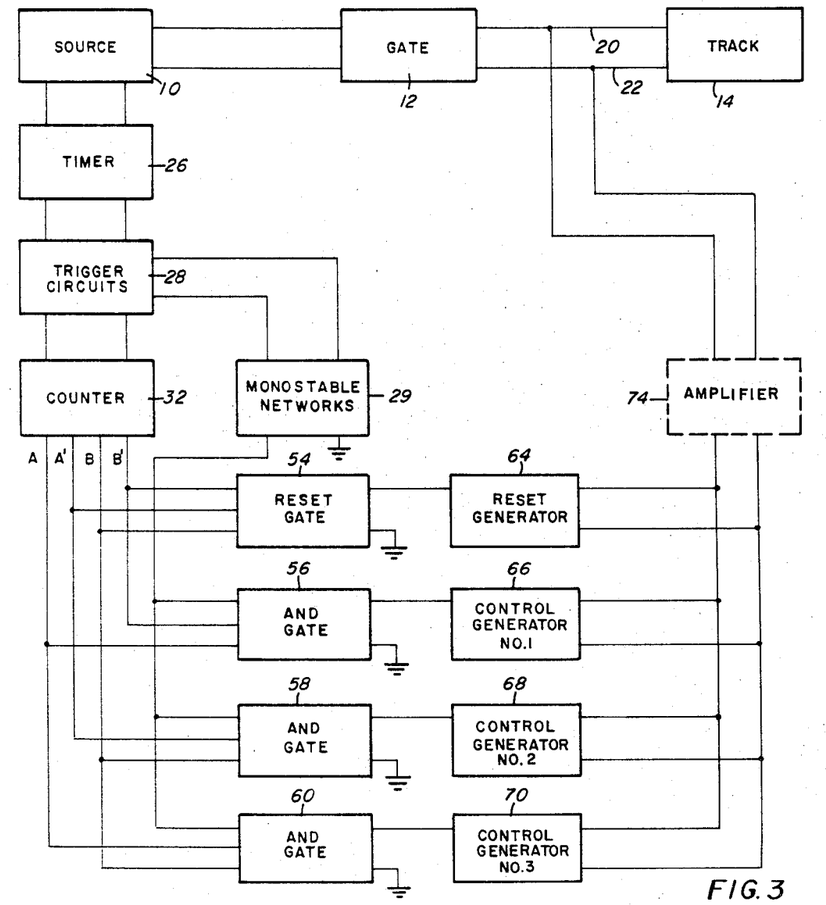
FIG. 3 is a block diagram of a base unit utilizing amplitude-modulated digital or single-frequency control signals.

FIG. 3 illustrates in block diagram form a base unit which utilizes digital control generators energized by means of a counter to produce the desired sequence of output signals. As in FIG. 1, the base unit includes a source of power 10 which is applied through gate 12 to the track 14. The output of source 10 also operates a timer 26 to energize the trigger and monostable circuits 28 and 29. Each output from the trigger circuit 28 advances the counter 32 one step, each step changing the output values on the four output lines A, A', B and B' as is well known in the digital counter art. Selected pairs of outputs from the counter 32 are applied to each of four gates, a reset gate 54 and AND gates 56, 58 and 60. Each of these gates requires three positive input signals before it will produce an output signal. The counter 32 produces positive signals on two of its four lines at any given time, thus selecting only one of the four gates. The occurrence of an output signal from network 29 will provide the third positive signal at the selected gate and will cause that gate to produce an output signal for the duration of the output from network 29. Selection of reset gate 54 will cause reset generator 64 to produce a digital pulse of a predetermined amplitude for transmission through lines 20 and 22 to the track 14. Similarly, selection of AND gate 56, 58 or 60 will result in generation of a control signal of predetermined amplitude from control generators 66, 68 or 70 respectively. These control generators may be used to provide steering or speed control signals for one or more remote vehicles in sequence. Although only three control generators have been shown, it will be apparent that the number of such generators actually used will depend upon the number of vehicles and functions to be controlled. Normally, two control generators will be used for each vehicle, one to control the steering and one to control the speed. If digital control is to be used, each control generator may operate at the same frequency or may be an amplitude-modulated DC pulse, whereas if multiple frequency is to be used, each control generator will operate at a different frequency but will again be amplitude-modulated to produce the desired control operation. It will be apparent that the amplitudes of these various control signals normally are manually controlled to provide the operator of the system with means for controlling the operation of the remote vehicles.

Figure 4:
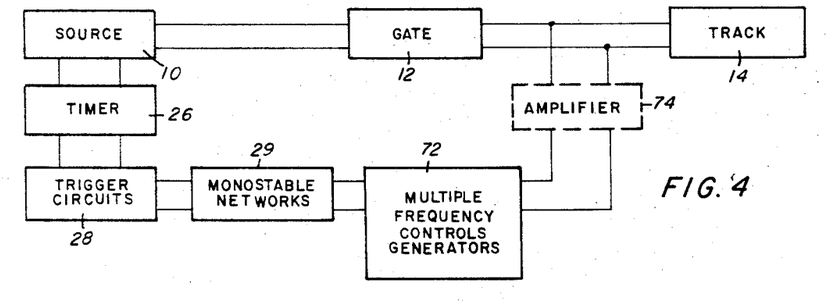
FIG. 4 is a block diagram of a base unit which utilizes multiple frequency control circuits.

The difference between the digital control and the multiple frequency control systems is seen by comparing the block diagram of FIG. 3 with that of FIG. 4, wherein the counter mechanism and the gating circuits are eliminated. Thus, the circuitry of FIG. 4 includes a power supply 10 feeding a gating circuit 12 and a track surface 14. The source 10 also energizes a timer 26, a trigger circuit 28 and monostable networks 29. The output from network 29 is applied to the multiple frequency control generators 72 which are all energized simultaneously to produce their respective output signals. Any number of control generators may be used in circuit 72, depending upon the number of vehicles to be controlled on track 14. As noted above, two control generators will normally be used for each vehicle, one generator supplying speed control signals and the other generator supplying steering control signals. Since each generator operates at its own frequency, their control functions can be kept distinct through the use of tuned circuits in the remote vehicles, thus permitting all the signals to be transmited at the same time. As before, these signals are transmitted during the delay period of the power source provided by gate 12, but each control signal will be transmitted during each delay period, rather than sequentially. As illustrated in both FIGS. 3 and 4, amplifier means 74 may be provided at the output of the control generators, if required.

It will be apparent that counter and gating means may be used in conjunction with the multiple frequency system of FIG. 4 if so desired. Such an arrangement might become desirable if a large number of remote units are to be used on a single track; however, this is a matter of design selection.

Figure 5:
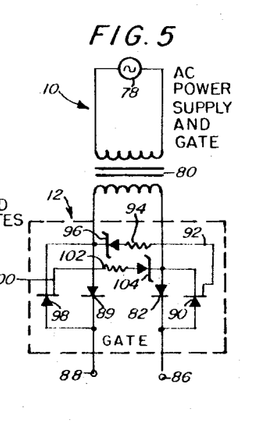
FIG. 5 illustrates an alternating current power supply and gating circuit.

Referring now to the detailed schematic diagrams of the base unit, FIG. 5 illustrates an alternating current power supply and gate such as that illustrated at 10 and 12 in the preceding block diagrams. As shown, the output of an alternating current source 78 is applied to the primary winding of a transformer 80, the secondary of which applies alternating current to the gate 12. Source 78 may be a standard 60 cycle supply or any other convenient source. The output terminals of the secondary winding of transformer 80 are connected through diodes 82 and 84 to output lines 86 and 88, respectively, the diodes being connected with their anodes to the terminals of the secondary winding and their cathodes to their respective output lines. A silicon controlled rectifier (SCR) 90 is connected in reverse direction across the diode 82, the anode of SCR 90 being connected to the cathode of diode 82 and vice versa. The control electrode 92 is connected through a gate current limiting resistor 94 and a Zener diode 96 to the anode of diode 84. Similarly, a silicon controlled rectifier 98 is connected in shunt with diode 84, its control electrode 100 being connected through a gate current limiting resistor 102 and a second Zener diode 104 to the anode of diode 82.

In operation, as the upper end of the secondary winding of transformer 80 becomes positive, no current will flow into a load connected across lines 86 and 88 because SCR 98 and diode 84 present open circuits. When the voltage on the secondary winding reaches the firing voltage of Zener diode 104, this diode will fire and the current will flow through resistor 102 to fire SCR 98. This provides a path for return current from diode 82 through the load to the lower side of the secondary winding, which current will continue to flow until the voltage across the secondary winding returns to zero. When this occurs, SCR 98 opens and disconnects the power supply from the load, the SCR remaining open until the next positive half-cycle. On the negative half-cycle of the alternating current input, there is initially no current flow to the load because SCR 90 and diode 82 present open circuits. When the voltage on the secondary winding reaches the firing voltage of Zener diode 96, current flows through resistor 94 to fire SCR 90. This provides a path for return current from diode 84 through the load to the upper terminal of the secondary winding. As before, the current continues to flow through the load until the voltage across the secondary winding returns to zero and opens SCR 90. This SCR will not fire again until the next succeeding negative half-cycle.

The foregoing two operations take place for each complete cycle of the alternating current supply. Between each half-cycle, from the time that the secondary voltage is zero until the respective Zener diode and silicon controlled rectifier fire, the power supply is disconnected from the line and presents an extremely high impedance to any control signals which may be impressed on lines 86 and 88, thus preventing excessive loading of the signal generators. As has been noted above, the output lines of the gating circuit 12 are connected to the lead lines 20 and 22 for connection to the track surface 14. It will be understood that the control signal generators are connected to these same feeder lines during the off time of the power supply, but must be disconnected from the lead lines during the "on" time of the power supply.

Figure 6:
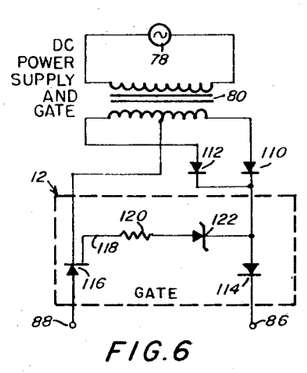
FIG. 6 illustrates a direct current power supply and gating circuit.

A direct current power supply and gate suitable for use in the present system is illustrated in FIG. 6. This power supply includes a source of alternating current 78 feeding a power transformer 80. The output of the secondary winding is fed through diodes 110 and 112, these diodes having their cathodes connected to the anode of a third diode 114 in known manner to form a source of direct current to an output line, or load terminal, 86. A center tap on the secondary winding of transformer 80 is connected through the cathode and anode of a silicon controlled rectifier 116 to the other load terminal 88. The control electrode 118 of SCR 116 is connected through a gate current limiting resistor 120 and a Zener diode 122 to the anode of diode 114.

When the secondary voltage of transformer 80 is zero, SCR 116 is open and the load is disconnected from the power supply. When the secondary voltage increases in either direction from zero, either diode 110 or 112 will allow a positive increasing voltage to appear at the anode of diode 114. When this voltage reaches the firing voltage of Zener diode 122, current will flow through resistor 120 into the gate, or control, electrode 118 of SCR 116 to fire it. This provides a return path for current from terminal 86 through the load to the center tap of the secondary winding, which current will continue to flow until the voltage across the secondary returns to zero, at which time the SCR opens and disconnects the power supply from the load. Inasmuch as the circuit provides full-wave rectification, the same sequence will occur on each succeeding half-cycle. As with the alternating current power supply, an extremely high impedance to control signals is presented by the power supply during the delay period between the time the input voltage from source 78 is zero and the time that SCR 116 fires. Thus, control signal generators may be connected to the load during this period without unduly loading the generators.

With both the AC and the DC power supply, some form of gating circuit must be provided to connect the control signal generators to the feeder lines 20 and 22 during the control time and to disconnect these generators during the power time of the power supply. Such a circuit is shown in the schematic diagram of FIG. 7 wherein the basic frequency of the alternating current power supply is used as a timing clock to operate a standard Schmitt trigger circuit and two monostable circuits.

Figure 7:
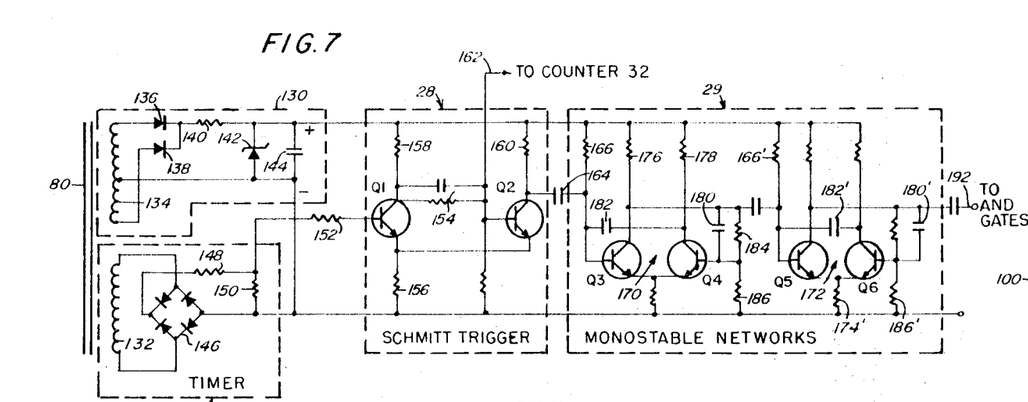
FIG. 7 is a circuit diagram of a preferred embodiment of a portion of the block diagram of FIG. 3.

Referring now to FIG. 7 there is illustrated a timer circuit 26 and a regulated power supply 130 fed by secondary windings 132 and 134 respectively, of the transformer 80. Transformer 80 receives its supply of alternating current from source 78, as illustrated in FIG. 5. Power supply 130 includes diodes 136 and 138 connected for full wave rectification, a resistor 140 connected in series with the output of diodes 136 and 138, a Zener diode 142 connected between resistor 140 and the center tap of secondary winding 134 to regulate the output voltage, and a filter capacitor 144 connected in shunt with diode 142. This power supply provides the required bias voltages for the system, the central tap of winding 134 providing a ground reference point.

The timer circuit 26 includes a bridge rectifier 146 connected across secondary winding 132, the output of the bridge being applied through a resistor 148 to a load resistor 150. The timer circuit produces a full wave rectifier DC which provides a positive pulse for each half-cycle of the alternating current source. The amplitude of the output of this circuit is determined by the values of resistors 148 and 150, the output appearing across resistor 150. The positive output pulse from the clock circuit is fed through resistor 152 to the input of Schmitt trigger circuit 28. When the positive-going output of the timer circuit exceeds some predetermined critical voltage, as determined by the biasing voltages of the Schmitt trigger, the trigger changes states.

Schmitt trigger 28 comprises a normally nonconductive transistor Q1 and a normally conductive transistor Q2 connected in known manner with the collector of Q1 connected through a parallel RC network 154 to the base electrode of transistor Q2. The emitter electrodes of Q1 and Q2 are connected through a common bias resistor 156 to ground while their collectors are connected through bias resistors 158 and 160, respectively, to the power supply 130. An output lead 162 is connected to the base of Q2 to provide a triggering voltage for the counter 32. It will be understood that upon application of the predetermined voltage at the base of Q1, this transistor starts conducting and Q2 becomes nonconductive. When the output of the timer circuit falls below the predetermined critical voltage, Q1 again becomes nonconductive, returning the trigger 28 to its original state and producing a negative pulse at the collector of Q2. This negative pulse is applied through coupling capacitor 164 to the input of monostable networks 29. When transistor Q2 is cut off, the voltage at its collector rises to the value of the bias voltage power supply 130, but when Q2 returns to its initial state of conduction, current will flow through resistor R160 to cause a voltage drop at the collector. This voltage drop is the negative pulse which is applied to the monostable network.

The monostable network 29 includes two cascaded monostable multivibrator stages 170 and 172, the first monostable circuit responding a predetermined time after being activated by the output of the Schmitt trigger to produce a negative pulse which, in turn, triggers the second monostable circuit to produce a positive output gating voltage. The first monostable stage includes a pair of transistors Q3 and Q4 connected in the conventional manner with their emitter electrodes connected through resistor 174 to ground and their collectors connected through resistors 176 and 178, respectively, to the source of bias voltage 130. The collector of Q3 is connected through a capacitor 180 to the base of Q4 and the collector of Q4 is connected through capacitor 182 to the base of Q3. A resistor 184 is connected in shunt with capacitor 180 and the base of transistor Q4 is connected through resistor 186 to ground. Upon application of a negative pulse to the base of normally conductive transistor Q3, it is driven toward its cutoff condition, causing the voltage on its collector to rise. This rising voltage is applied through by-pass, or speed-up, capacitor 180 to the base of Q4 to turn Q4 on. Charging of capacitor 182 through transistor Q4 and resistors 166 and 174 will cause Q3 and Q4 to return to their initial states after a predetermined time established by the time constant of capacitor 182 and resistors 166 and 174. Capacitor 182 charges through resistor 166 until the voltage at the base of Q3 exceeds the voltage across resistor 174, turning Q3 on and Q4 off. When transistor Q3 begins to conduct, a decreasing voltage appears on the collector of Q3. This decreasing voltage pulse is applied through coupling capacitor 190 to the base electrode of transistor Q5 in the monostable network 172.

Circuit 172 includes transistors Q5 and Q6 connected in the manner of circuit 170, with Q5 being normally conductive and Q6 being normally nonconductive. Q5 responds to the negative input pulse and turns off, producing a positive pulse at its collector, which pulse appears at output terminal 192. When Q5 is cut off, Q6 becomes conductive and remains in this state for a period of time determined by the time constant of capacitor 182' and resistors 166' and 174'. When it returns to its initial state, transistor Q5 again becomes conductive to reduce the collector voltage at Q5 to its initial value and end the positive pulse at terminal 192. Thus, the duration of the pulse at terminal 192 is the delay time of the second monostable network 172. By proper design of the delay times of the Schmitt trigger and the two monostable networks 170 and 172, the positive output pulse at terminal 192 will occur during the "off" time of the power supply of FIG. 5 or FIG. 6, and will be of shorter duration than that delay time. This positive pulse is used to gate the control circuits and thus to connect the control generators to track 14.

Figure 8:
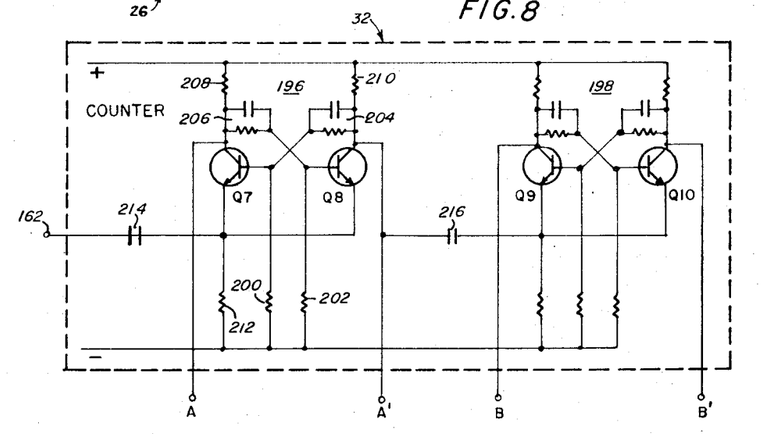
FIG. 8 is a circuit diagram of a preferred embodiment of a counter circuit for use with the embodiment of FIG. 3.

The power supply and gating circuitry of FIGS. 5 or 6 and FIG. 7 are utilized in the base unit to activate the control generators for any type of control generator. If digital control is to be used, then the counter circuit 32, the AND gates and the control generators shown in FIG. 3 must be used, but if multiple frequency control generators are to be used, the output pulse at terminal 192 is used to gate these generators directly. Both systems will be described below, the digital method of control being described first.

Where the generated control signals are to be transmitted through track 14 during separate control times, the counter 32 shown in detail in FIG. 8 is required. This counter utilizes standard bistable flip-flops arranged to count in a known manner. As illustrated in FIG. 8, the counter 32 includes two bistable circuits 196 and 198 connected in cascade in a conventional manner. Bistable circuit 196 includes transistors Q7 and Q8 having their base electrodes connected through resistors 200 and 202, respectively, to ground and through RC networks 204 and 206, respectively, to the collectors of Q8 and Q7, respectively. The collectors of Q7 and Q8 are connected through resistors 208 and 210, respectively, to the positive terminal of the regulated power supply 130 (FIG. 7). The emitter electrodes of transistors Q7 and Q8 are connected through resistor 212 to ground. These emitters are connected through a coupling capacitor 214 to the output line 162 of Schmitt trigger 28 (FIG. 7) from which the bistable network 196 receives the pulses to be counted. Output A of the counter is obtained from the collector of transistor Q7 while output A' is obtained from the collector of Q8.

The collector of Q8 is coupled through a capacitor 216 to the emitters of Q9 and Q10 of the second counter network 198, the construction of which is identical to bistable 196. The second counter stage includes transistors Q9 and Q10, with output B being obtained from the collector of Q9 and output B' being obtained from the collector of Q10. This counter operates in the conventional manner, providing either a "no-signal" or a "signal" condition at each of the outputs A, A', B, and B', the condition of the outputs providing a binary indication of the number being counted.

In operation, an output is obtained from Q1 of the Schmitt trigger for each half-cycle of the alternating current source, each pulse being applied through line 162 to advance the counter one digit. For example, it is assumed that the counter is initially in the state 0—0, indicated by the presence of output signals at A' and B'. When the first half-cycle of the AC wave form occurs, the Schmitt trigger produces a positive pulse which triggers the counter to advance it to the next state 0—1, which corresponds to the digit one. To effect this change, the positive pulse applied to Q8 turns off Q8 and causes Q7 to become conductive. The following input pulse produced by the second half-cycle of the AC voltage causes Q8 to again become conductive, cutting off Q7 and producing a pulse through coupling capacitor 216 which turns Q10 off and Q9 on. Thus output signals appear on terminals A' and B, corresponding to the digit two. The next pulse on line 162 again turns Q8 off and Q7 on, resulting in outputs on terminals A and B, representing the digit three. The next half-cycle of the AC voltage returns the counter to a state 0—0, completing the counting cycle. Inasmuch as the counter remains in each state until the next input pulse from the Schmitt trigger, it remains in a given state through the delay period of power supply and thus may be used to gate the proper control generator.

Figure 9:
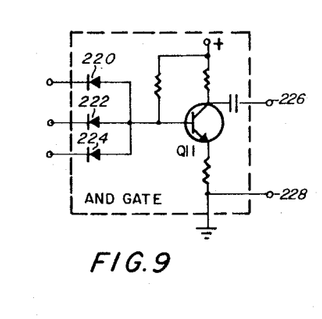
FIG. 9 is a circuit diagram of an AND gate suitable for use in the embodiment of FIG. 3.

In order to select the proper control generators for each delay period of the power supply, AND gates such as that illustrated in FIG. 9 are used. This is a standard diode AND gate comprising three input diodes 220, 222 and 224, the anodes of which are connected to the base electrode of a transistor Q11. One AND gate is required for each of the control generators illustrated in FIG. 3, and in this arrangement one of the input diodes is connected to the output of the monostable networks 29, the remaining two inputs being connected to selected outputs of the counter 32. Each state of the counter thus provides "true" signals to two input diodes of only one gate, thus selecting that gate for operation upon occurrence of an output from the monostable network. As is well-known, the AND gate requires an input signal on each of its three input diodes before it will produce an output. Thus each AND gate corresponds to a single state of the counter circuit so that only one control generator will be activated at a given time. As has been noted previously, a reset generator may be included in the system to provide synchronizing pulses for the system. This reset pulse normally will be generated when the counter is in the 0—0 state, with activation of the control generators following in sequence. It will be understood that a two-stage counter and four generator circuits have been illustrated for convenience and that if additional generators are to be used in the system, a larger counter circuit must be used. Of course, if a type of control generator is used which permits a plurality of control signals to be transmitted during a single delay period, then each AND gate may be used to activate a number of control generators, thus reducing the number of stages required for the counter.

The output signal from transistor Q11 of the AND gate, which appears across terminals 226 and 228, is a negative pulse of the same duration as the output of monostable networks 29. This pulse is used to close a transistor switch in the output of a control signal generator, which generator may be a digital generator, a constant frequency variable amplitude generator, or the like, as previously described. If a digital control generator is to be used, the output of transistor Q11 is applied through resistor 230 to the base of transistor Q12 of FIG. 10. The digital control signal generator of FIG. 10 receives its bias voltage from the regulated DC supply (FIG. 7) and includes a control potentiometer 232 and a diode 234 connected in series with the collector of Q12. The output of potentiometer 232 is obtained from sliding contact 236 and applied through capacitor 238, across resistor 240 and through diode 242 to the output terminals 244 and 246. Transistor Q12 acts as a switch to disconnect the output of the generator from the track 14 except during the delay time of the power supply corresponding to the particular control signal generator. When a negative pulse from the output of the AND gate corresponding to the particular digital control signal generator appears at terminals 226 and 228, Q12 turns on, completing the circuit through potentiometer 232 and allowing an output to appear at output terminals 244 and 246, which terminals are connected to the track lead lines 20 and 22 (FIG. 3). This output voltage is present for the duration of the pulse from the monostable network 29, resulting in a positive pulse whose amplitude is determined by the position of the sliding contact 236. Diodes 234 and 242 serve to block the power pulses applied to lines 20 and 22 from reaching the control signal generator.

Figure 10:
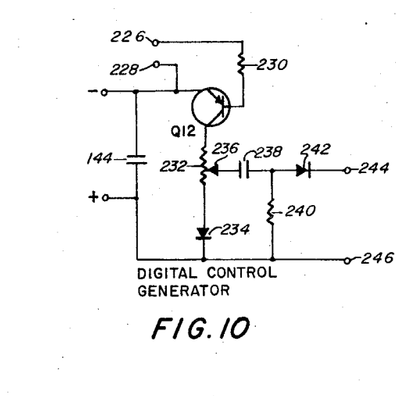
FIG. 10 illustrates a circuit diagram of a digital control signal generator suitable for use in the embodiment of FIG 3.
Figure 11:
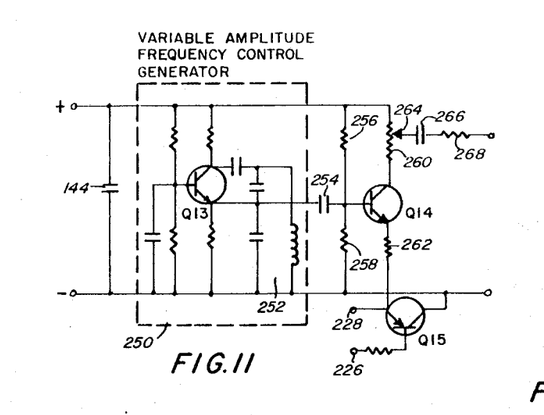
FIG. 11 illustrates a variable amplitude frequency control circuit suitable for use in either the embodiment of FIG. 3 or FIG. 4, depending upon the frequency generated by this circuit.

If the variable amplitude frequency control generator is to used, the circuitry of FIG. 11 is substituted for that of FIG. 10. This circuit includes a standard Colpitts oscillator 250 operating at a constant predetermined frequency. The oscillator receives its bias voltage from the DC supply 130 (FIG. 7) and includes a transistor Q13 connected to an LC tank circuit 252 in the well known configuration. The output of this oscillator is applied through coupling capacitor 254 to the base electrode of an amplifier Q14. The base of Q14 is connected through resistor 256 to the source of positive bias voltage and through resistor 258 to ground; its collector is connected through potentiometer 260 to the positive bias voltage; and its emitter is connected through resistor 262 to the emitter of switching transistor Q15. The base and emitter of Q15 are connected to the output terminals 226 and 228 of the AND gate of FIG. 9 and its collector is connected to ground. The appearance of an output pulse across terminals 226 and 228 cause switch Q15 to close, completing the circuit through Q14 and permitting an output voltage to appear on the sliding contacts 264 of potentiometer 260. This voltage will be of a frequency determined by the frequency of the Colpitts oscillator and will have an amplitude determined by the positioning of sliding contacts 264. As previously noted, the sliding contact is preferably manually operated to provide desired operator control.

Figure 12:
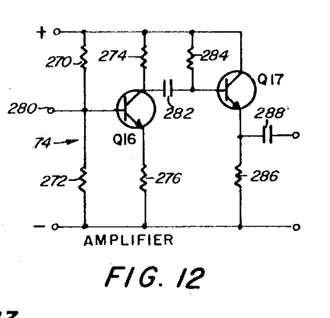
FIG. 12 illustrates an amplifier suitable for use in the embodiments of FIGS. 3 and 4.

It will be apparent that the frequency of the Colpitts oscillator 250 may be adjusted to any desired value so that the output of each generator used in the system can be of the same or of differing frequencies. The output of FIG. 11 may be applied through capacitor 266 and resistor 268 directly to lead lines 20 and 22 and thus to track 14 or may be applied through amplifier 74 shown in FIG. 12.

Amplifier 74 includes transistor Q16 connected in well known configuration with resistors 270, 272, 274 and 276 providing proper bias conditions. The input to the amplifier is supplied to the base of Q16 at terminal 280, the output of this transistor being applied through coupling capacitor 282 to the base of emitter-follower transistor Q17. The latter is provided with bias resistor 284 and its output appears across load resistor 286. Emitter-follower Q17 provides impedance matching between amplifier Q16 and the track 14, the output of Q17 being applied through coupling capacitor 288 to lead lines 20 and 22. Where a number of control signal generators are connected in parallel to the amplifier of FIG. 12, the output of each is connected to input terminal 280. In this situation, the resistor indicated at 268 in FIG. 11 serves to isolate the outputs of the various oscillators from each other.

Figure 13:
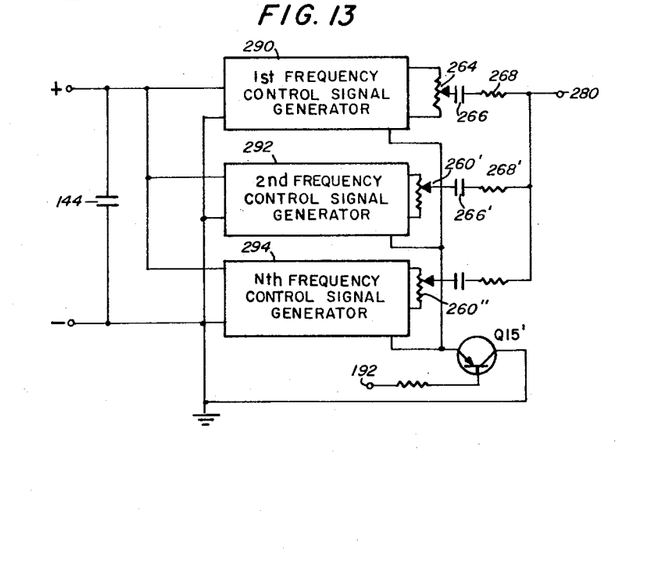
FIG. 13 illustrates the arrangement of the several frequency control signal generators used in conjunction with the embodiment of FIG. 4, each generator being similar to that illustrated in FIG. 11.

When the multiple frequency control generator system of FIG. 4 is used, a plurality of control signal generators such as that illustrated in FIG. 11 are used, the several generators being connected in parallel in the manner illustrated in FIG. 13. Each of the generators 290, 292 and 294 shown in that figure receive their bias voltages from the regulated power supply 130 of FIG. 7 and includes a Colpitts oscillator and an amplifier in the manner shown in FIG. 11. The outputs of these generators are obtained from potentiometers 260, 260' and 260'', respectively, and are fed in parallel to the terminal 280 of the amplifier shown in FIG. 12. Inasmuch as the system of FIG. 4 contemplates the transmission of control signals from all these generators simultaneously, only one switching transistor Q15′ is required to connect the outputs of the generatos to terminal 280 and thus to the track 14. Switch Q15′ is connected directly to output terminal 192 of the monostable networks 29 (FIG. 7) and is turned on by the output pulse from those networks. The "on" time of Q15′ corresponds to the time and duration of the output pulse from network 29 and connects generators 290, 292, and 294 to the output terminal in the manner described with respect to FIG. 11, thus applying all the control signals to the track during each delay period of the alternating current source. The control signal applied to track 14 is a complex wave form which is a combination of the outputs of all the control signal generators.

Having described various combinations of base units which utilize either AC or DC power supplies, reference is now made to the remaining figures which illustrate examples of remote units which may be carried by the vehicles to be controlled. The circuits to be described are used in the remote vehicles to convert the generated signals to steering or speed control signals or to any other function control. As will appear below, different on-board circuits are required to respond to the various base signals above-described. The following descriptions will be directed to the remote units carried by a single vehicle; additional vehicles will carry similar equipment that will include delay circuits of different parameters so as to respond at different times or will carry tuned circuits designed to respond to control signals of different frequencies.

Figure 14:
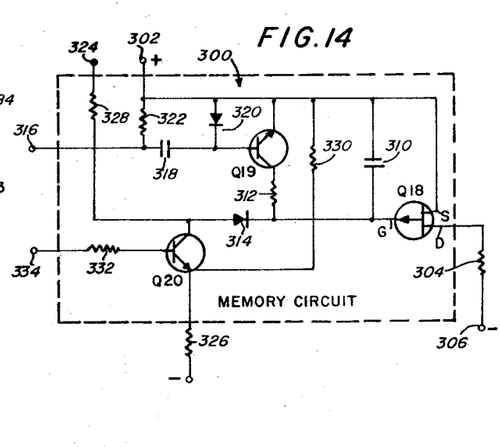
FIG. 14 is a schematic diagram of a novel memory circuit suitable for use in the speed control system of FIG. 15.

A basic element in the remote units of the present invention is the use of one or more memory circuits on board the vehicle to be controlled. This memory circuit receives the control information transmitted during a delay period in the power supply and remembers this information until new information is transmitted during the next delay period allotted to the particular control. FIG. 14 illustrates the memory circuit preferred for use in the present system, the memory being indicated generally by the numeral 300. A basic component of this memory circuit is the field effect transistor Q18 which includes gate (G), source (S) and drain (D) electrodes. A Texas instruments transistor 2N2386 has been found to be suitable for this circuit. A positive bias voltage is applied to the memory circuit through terminal 302 while the negative, or ground, potential is applied to the circuit by way of load resistor 304 from terminal 306. When the field effect transistor Q18 is connected to the positive voltage at terminal 302 with a load resistor 304 in series with the drain electrode and zero voltage on the gate electrode with respect to the source electrode, a quiescent current flows from the source electrode to the drain electrode. If the gate is made positive with respect to the source electrode, the source-to-drain current decreases. If the gate voltage continues to become more positive with respect to the source electrode, a gate voltage will be reached which will reduce the source-to-drain current to zero. Care must be taken that the gate does not become negative with respect to the source, otherwise the source-to-gate diode will be forward biased.

When the gate electrode (G) is positive with respect to the source electrode (S), the gate-to-source and gate-to-drain leakage current is the reverse-biased leakage current of a silicon diode and thence is very low. Leakage is sufficiently low that a 0.02 microfarad capacitor will retain a charge for several minutes when placed across one of these junctions with proper bias polarity. Storage capacitor 310 is such a capacitor and is connected between the gate and the source of transistor Q18. If a positive voltage greater than that of the bias source applied to terminal 302 is placed on capacitor 310, this voltage will remain on the capacitor until the shunt transistor Q19 is turned on to place resistor 312 across capacitor 310; Q19 thus acts as a switch to provide a discharge path for capacitor 310. A diode 314 is provided to insure that resistor 312 provides the only leakage path for capacitor 310. Transistor Q19 must have a very low leakage current and preferably is a silicon transistor. This transistor is turned on and off with a positive pulse applied to lead 316 through capacitor 318. Diode 320 and resistor 322 provide a discharged path for capacitor 318. Diode 320 preferably is a silicon diode to eliminate collector-to-base leakage in transistor Q19. A diode is used here rather than a resistor since the collector-to-base junction would act as an emitter-to-base junction and Q19 would turn on due to leakage current. It should be noted that the trigger voltage applied to line 316 must be greater than the bias voltage applied to terminal 302 in order to turn transistor Q19 on.

The control voltage which is to be placed in the memory circuit and held there is applied through input line 324 across the collector of a transistor Q20 to diode 314. When Q20 is nonconductive and the control voltage on line 324 is greater than the bias voltage on line 302, the control voltage will pass through diode 314 and will charge capacitor 310 to the value of the control voltage. If, at the time the control voltage is applied, transistor Q20 is conductive, this input voltage will not be applied to capacitor 310 inasmuch as the emitter resistor 326 or Q20 is small compared to the resistance 328 in the input line, causing diode 314 to be back biased. Resistors 330 and 326 are connected between the positive bias source and ground to form a voltage divider to which the emitter of Q20 is connected. The voltage divider holds Q20 nonconductive unless a positive voltage is applied through the base current limiting resistor 332 from line 334.

For the control systems of the present invention, the memory circuit of FIG. 14 is used as follows. Lines 334 and 316 are connected to the collector electrodes of a pair of transistors connected in a monostable network. In the stable condition of the monostable network, line 334 is connected to the collector of the off transistor. This provides a positive voltage which holds transistor Q20 in its on, or conductive, condition. Line 316 is connected to the collector of the on transistor in the monostable network. Transistor Q19 is normally off, thus holding open the discharge path of capacitor 310. The control voltage to be stored in the memory is applied to input line 324 and a trigger pulse is applied to the monostable network. When the monostable network changes states, transistor Q20 is turned off and transistor Q19 is turned on. These transistors are held in these states for the delay time of the monostable network. During this delay time, transistor Q20 presents a high impedance to the input control voltage, directing it to capacitor 310. Resistor 312 is connected across 310 to stabilize the voltage across this capacitor to the value of the input control voltage. The delay time of the monostable network should be of shorter duration than the input control signals so that a charge is trapped on capacitor 310 when the monostable network reverts to its stable condition, turning transistor Q19 off and transistor Q20 on. The voltage thus trapped on capacitor 310 remains substantially constant until the next input cycle, and this voltage determines the conductivity of field effect transistor Q18 and thus the voltage appearing across load resistor 304.

Figure 15:
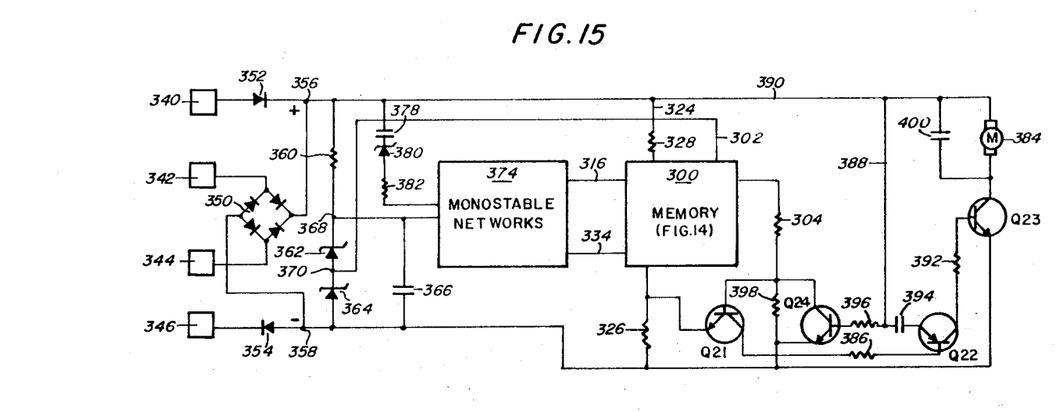
FIGS. 15 and 15A are a partial schematic diagram and a variation of a remote speed control circuit suitable for use in the block diagram of FIG. 1, the circuit being responsive to digital or single-frequency control signals.

The use of the above-described memory circuit in a speed control network is illustrated in FIG. 15. The input to this circuit is obtained through contacts 340, 342, 344 and 346 which are arranged on the underside of the vehicle so that two or more contacts touch metal tapes of opposite polarity on the surface of track 14 at all times. Diode bridge 350 and diodes 352 and 354 are connected to the contacts so as always to direct power or control signal voltages of positive polarity to point 356, with junction 358 as the ground, or return point. Resistor 360, Zener diodes 362 and 364 and capacitor 366 form a regulated power supply with two voltage taps, junction 368 being of higher potential than point 370.

The circuit of FIG. 15 includes a two-stage monostable network 374, the first and second stages being substantially the same as the monostable circuits 170 and 172 shown in FIG. 7. The positive bias for this network is obtained from point 368 and the network is connected to ground through line 376. The first stage of the network is triggered by the reset control signal generated at the base station and has a delay time which lasts until the control period allotted for this particular control circuit. As was the case with the monostable network 29 of FIG. 7, the end of the delay time of the first stage applies a pulse to the input of the second stage, causing the second stage to change to its unstable state. Network 374 differs from network 29 in that an output is obtained from each of the transistors of its second stage, an output being obtained on line 334 when the second stage is in its stable condition and an output being obtained from line 316 when the second stage is in its unstable condition.

In order to insure that the monostable network 374 operates at the proper time, it is provided with a trigger circuit which is capable of blocking the low frequency power supply voltage and is further capable of distinguishing the reset signal from the remaining control signals. This circuit includes a capacitor 378 which blocks the power supply voltage, a Zener diode 380 and a resistor 382. The voltage level at which the Zener diode fires must be exceeded by the incoming reset signal before the monostable 374 will be triggered. To insure that the reset signal is distinguishable from the control signals, it is required that only the reset signal exceed this firing voltage and that the maximum amplitude of any control signal be less than the firing level of diode 380.

As has been noted above, the delay time of the first monostable stage is adjusted by proper selection of the circuit parameters so that it does not trigger the second stage until the appropriate control signal is being transmitted through track 14. The triggering of the second monostable stage provides the appropriate voltages to the memory circuit 300, opening the storage capacitor to reception of a control signal through line 324, which voltage is sensed by one or more of the contacts 340, 342, 344, or 346. The delay time of the second stage of the monostable circuit 374 ends before the control signal is removed from track 14 so that the voltage stored in capacitor 310 (FIG. 14) is equal to the amplitude of the control signal which has been sampled. As has been noted, the voltage across this capacitor, and thus across load resistor 304, remains constant until the next signal is placed on capacitor 310. The output of the memory can be used continuously without affecting the charge on 310, inasmuch as the output is determined by the conductivity of Q18, and it is this output which is used to control the speed of the drive motor in the remote vehicle in the circuit of FIG. 15.

The drive motor in FIG. 15 is indicated at 384 and its speed is a function of the charge on capacitor 310 in the memory circuit. The control signal for the motor is obtained by means of a DC amplifier Q21 which senses the voltage drop across load resistor 304. The emitter of Q21 is connected through resistor 326 to ground and its base is connected to resistor 304, while its collector is applied through resistor 386 to the base of a second DC amplifier Q22. The emitter of Q22 connected to junction point 356 through lines 388 and 390, while its collector is connected through resistor 392 to the base of control transistor Q23. The collector-emitter junction of Q23 is connected in series with motor 384 and the conductivity of this transistor determines the current flow through motor 384 and thus the motor speed. Since the conductivity of Q23 is a function of the voltage at the base of Q21, the speed of the motor is a function of the charge on capacitor 310 and of the amplitude of the control signal corresponding to this particular circuit.

In order to prevent loading of the base unit control signal generators, transistor Q23 is turned off during the delay period of the power supply to open the motor circuit. This is accomplished by means of transistor Q24, the base of which is connected to point 356 through lines 390 and 388, through capacitor 394 and through base current limiting resistor 396. Capacitor 394 will block the direct current supply voltage but will pass the reset and control signals received at point 356. Thus, whenever a reset or control pulse appears, transistor Q24 is turned on, shunting the base bias resistor 398 of amplifier Q21 and tying the base of Q21 to ground. This causes a back bias on the emitter-to-base junction of Q21 and turns that transistor off; in turn causing Q23 to be cut off and holding it off for the duration of the control or reset pulse. A capacitor 400 may be provided across motor 384 to suppress brush noises. It should be noted that the speed control circuit of FIG. 15 may be made responsive only to control signals of a given frequency by providing suitable tuned circuits in the input of the memory circuit, whereby only the control signals of the selected frequency will be applied to storage capacitor 310.

Figure 16:
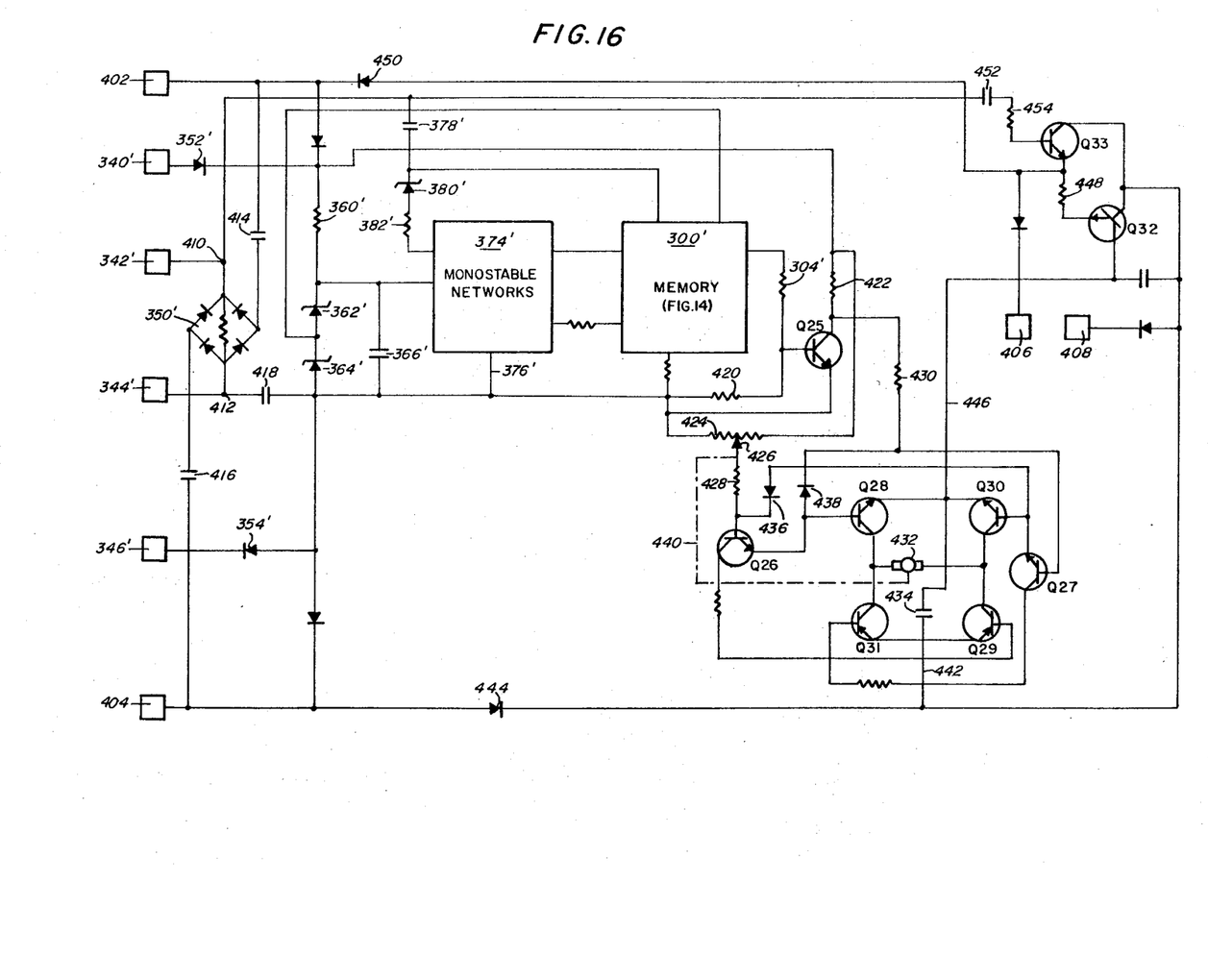
FIG. 16 is a partial schematic diagram of a steering control circuit for use in the remote unit illustrated in block diagram form in FIG. 1, the circuit being responsive to digital or single-frequency control signals.

In addition to the speed control circuit of FIG. 15, the remote vehicles normally will carry a steering control network such as that illustrated in FIG. 16. The particular control network illustrated here is designed for use with an alternating current power supply at the base unit; however, it will be apparent that the circuitry can be modified to receive direct current power. As with the speed control circuit of FIG. 15, digital control signals are received from the base unit, although frequency control signals can be used with the addition of appropriate tuned circuits. Elements of the circuit of FIG. 16 which are identical to and perform the same function as corresponding elements in FIG. 15 are indicated by corresponding primed members.

Contacts 402, 404, 340', 346', 406 and 408 are carried by the remote vehicle and are so arranged thereon as to insure that power is available to the steering circuit when the vehicle is in any position with respect to the surface of the track. Contacts 402, 342', 344' and 408 are arranged in conjunction with the bridge circuit 350' to insure that control pulses are available with proper polarity at points 410 and 412. Capacitors 414, 416, 418 and 378' are power isolation capacitors which block the power voltage but pass the digital control signals, including the reset signal, to the inputs of the monostable networks 374' and the memory circuit 300'. Resistor 360' and Zener diodes 362' and 364' provide a voltage divider from which the bias voltages for the monostable networks 374' and the memory circuit 300' are supplied. The first and second stages of the monostable networks 374', the reset trigger circuit 378', 380' and 382', and the memory circuit 300' operate in the manner described with respect to the speed control circuit of FIG. 15 and are used in exactly the same way to receive and store appropriate control signals. Thus, the desired steering control voltage appears across load resistor 304' of the memory circuit where it is sensed and used to position a steering control motor, whereby the position of this motor corresponds to the particular charge on capaictor 310 in the memory circuit (FIG. 14).

A resistor 420 is connected between load resistor 304 and ground to form a voltage divider and the junction of the resistors is connected to the base of a transistor Q25. This transistor comprises the first leg of a Wheatstone bridge, the second leg consisting of resistor 422 and the third and fourth legs comprising potentiometer resistor 424. A change in the steering voltage control signal on load resistor 304' changes the base current in transistor Q25 and thus changes the voltage across the emitter-collector of Q25 to produce an unbalance in the Wheatstone bridge. This unbalance is sensed either by transistor Q26 through the slide contact 426 and resistor 428 or by transistor Q27 through resistor 430, depending upon the polarity of unbalance. A small unbalance will be sufficient to turn on either Q26 or Q27. The emitter-collector junction of transistor Q26 is connected between the base of a transistor Q28 and the base of transistor Q29. Similarly, the emitter-collector junction of Q27 is connected between the base of a transistor Q30 and the base of a transistor Q31. Transistors Q28, Q29, Q30 and Q31 are connected in a bridge circuit, the collectors of Q29 and Q30 being connected together and to one end of a steering control motor 432; the collectors of Q28 and Q31 being connected together and to the other end of motor 432; and the emitters of Q28 and Q30 being connected together and through a capacitor 434 to the emitters of transistors Q29 and Q31. A diode 436 is connected between the bases of Q26 and Q30 and a diode 438 is connected between the bases of Q28 and Q27.

If Q26 is turned on by an unbalance in the Wheatstone bridge, the conduction of this transistor in turn causes Q28 and Q29 to become conductive, causing motor 432 to turn in a direction that will move the slidable contact 426 of potentiometer 424 in such a direction as to rebalance the bridge, motor 432 being connected to the slidable contact through a mechanical linkage 440. The motion of the sliding contact will rebalance the bridge and turn Q26, Q28 and Q29 off. The new position of the motor then corresponds to the voltage across resistor 304'. It will be apparent that the mechanical linkage 440 is connected to the steering wheels of the vehicle in which the circuitry is mounted so as to effect steering of the vehicle. An unbalance of the bridge circuit in the opposite direction will cause transistor Q27 to become conductive, turning on transistors Q30 and Q31 to rotate motor 432 in the opposite direction to again rebalance the bridge through mechanical linkage 440.

Power is supplied to the steering motor through line 442 and diode 444 connected to the ground reference side of the power input, and through line 446, transistor switch Q32, resistor 448 and diode 450 connected to the positive of the power supply input. Transistor switch Q32 is normally on and permits the flow of power from the base unit by way of the track 14 to the steering control motor. However, during each delay period in the power signal, a control signal is applied through capacitor 452 and a resistor 454 to the base of a transistor Q33, turning Q33 on and turning transistor switch Q32 off. This opens the steering motor circuit during the control time so that control signals will not be loaded by the motor.

Figure 17:
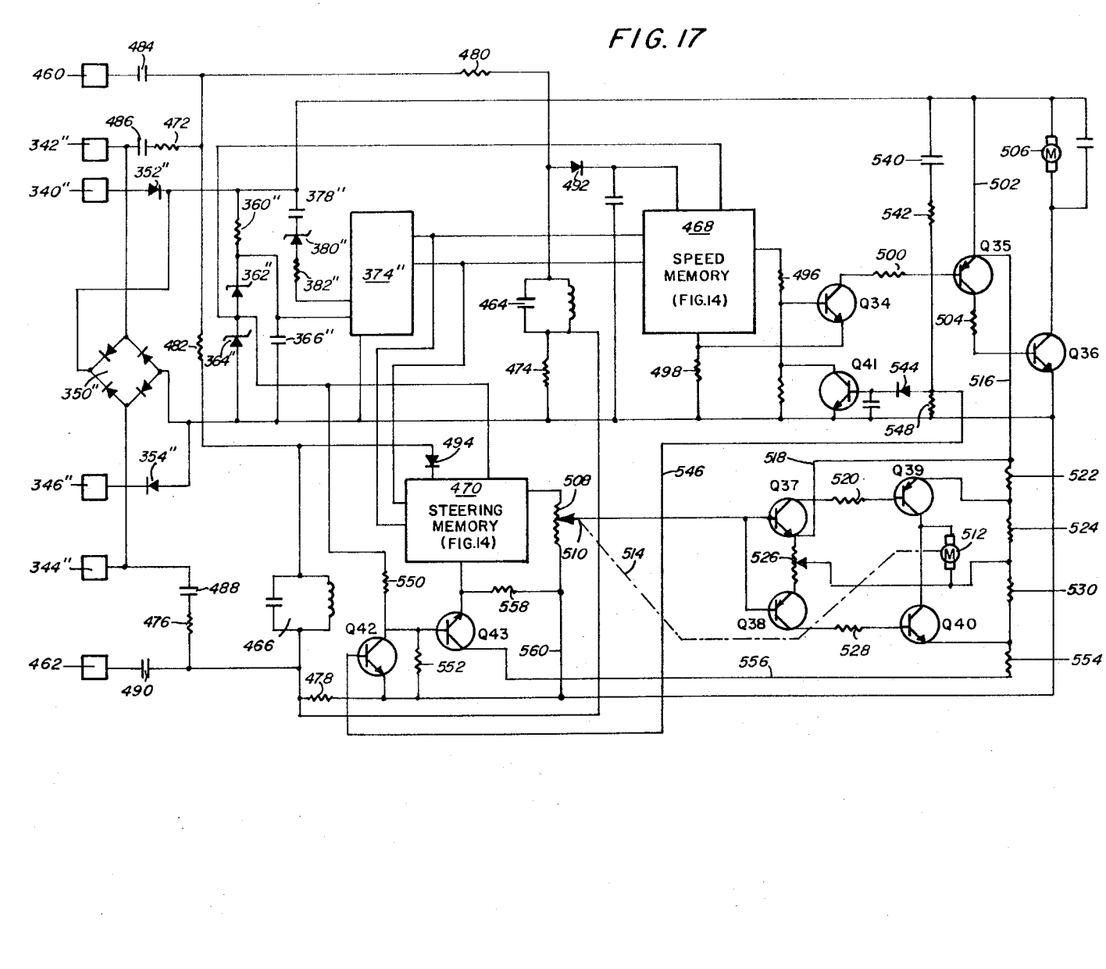
FIG. 17 is a partial schematic diagram of a remote unit responsive to the multiple frequency control circuits of FIG. 4, illustrating the tuned circuits required for receiving both speed and steering control signals simultaneously.

The final on-board system to be described is shown in FIG. 17 and includes both the steering and control circuits. This system can be used with either an alternating current or direct current power supply, and illustrates the use of tuned circuits which permit control by means of multiple frequency, variable amplitude control generators, but it will be apparent that digital control can be used with this system by suitably modifying the time delay in the monostable networks.

Referring now to FIG. 17, wherein the double primed numbers correspond to the similarly numbered components of FIGS. 15 and 16, the contacts 342", 340", 244" and 246" are connected through bridge circuit 350" and diodes 352" and 354" to direct input power signals from track 14 to the vehicle to be controlled. Contacts 342", 344", 460 and 462 direct the incoming control signals to the L-C tuned circuits 464 and 466 which, in turn, direct the appropriate frequency control signals to the speed memory 468 and the steering memory 470, respectively. Resistors 472, 474, 476, 478, 480 and 482 are isolation resistors and capacitors 484, 486, 488 and 490 are isolation capacitors, serving to insure that power pulses are not imposed on the frequency-sensitive circuits and memory networks. As in previous figures, diode bridge 350" and diodes 352" and 354" insure proper polarity of power voltage to the circuit.

The first and second stages of the monostable networks 374" used in the two previous on-board systems are used in this network; however, separate sets of monostable networks are not required for the steering and speed control portions of the systems since both the speed and steering control signals are transmitted during the same delay period of the power pulse. The signals are distinguished from each other by means of the tuned circuits 464 and 466 rather than by adjustment of the delay time in the monostable networks. The L-C nework 464 forms a tank circuit tuned to the frequency of the speed control generator of the base station, while the L-C network 466 forms a tank circuit tuned to the frequency of the steering control generator of the base unit. The voltage appearing across tuned circuit 464 is proportional to the amplitude of the signal generated by the speed control generator, and this voltage is applied through diode 492 to the input of the speed memory circuit 468 in the same manner as control signals were applied to the memory circuits of previous figures. Similarly, the voltage appearing across tuned circuit 466 is proportional to the amplitude of the signal generated by the steering control generator of the base unit, and this voltage is applied through diode 494 to the input of steering memory 470.

The speed control voltage stored in memory 468 appears across load resistor 496 and is amplified by transistor Q34, the emitter of which is connected through resistor 498 to ground and the collector of which is connected through resistor 500 to the base of amplifier Q35. The emitter of Q35 is connected through line 502 to a source of positive bias voltage and its collector is connected through resistor 504 to the base of transistor switch Q36. The collector-emitter junction of Q36 is connected in series with drive motor 506 of the remote vehicle and its degree of conductivity controls the speed of motor 506. Since the conductivity of Q36 is proportional to the voltage appearing on lead resistor 496, the speed of motor 506 will be proportional to the voltage stored in speed memory 468.

The steering control voltage stored in memory 470 appears across load resistor 508 which, in this case, is a potentiometer having a slidable contact 510. The steering circuit is comprised of a standard null-balance servo amplifier, and potentiometer 508 is the feedback resistor. This resistor is mechanically linked to the steering motor 512 thus as well as the steering mechanism of the vehicle through linkage 514. Slidable contact 510 is connected to the base of transistors Q37 and Q38, causing one or the other of these transistors to conduct, depending upon the direction of change in the voltage stored in steering memory 470 and appearing across resistor 508. If the voltage changes in a direction to cause Q37 to become conductive, a positive voltage will be applied through line 502, line 516, line 518, the emitter of Q37, the collector of Q37, resistor 520 and is applied to the base of transistor Q39. This turns Q29 on and applies the voltage from the voltage divider made up of resistors 522 and 524 to motor 512, causing it to turn in a direction to rebalance the system and turn Q37 off.

If the direction of unbalance across resistor 508 causes Q38 to turn on, the voltage on line 518 is applied through resistor 526, the emitter and collector of Q38, and resistor 528 to the base of a transistor Q40. This turns Q40 on and applies the voltage across the voltage divider comprised of resistors 524 and 430 to motor 512 and causes it to turn in such a direction as to rebalance the system and turn Q38 off.

As with prior systems, the drive and steering motor circuits must be disconnected from track 14 during the time that control signals are applied to the speed and steering memory circuits. The presence of control signals on track 14 is sensed by capacitor 540 which blocks the power voltage but passes the signal voltages through resistor 542 and diode 544 to the base of transistor Q41, and through line 546 to the base of transistor Q42. The voltage across resistor 548 turns Q41 on and ties the base of Q34 to ground, turning off Q34, Q35 and Q36, thus opening the circuit of motor 506. Similarly, the voltage across 548, when applied to the base of Q42, turns Q42 on. The collector of Q42 is connected to the base of transistor Q43, which is normally maintained in a conductive condition by the voltage divider comprised of resistors 550 and 552. Q43 completes the power supply for steering motor 412 through resistor 554, line 556, resistor 558, and line 560 to ground, but when Q42 is turned on by the presence of a control signal the base of Q43 is tied to ground and Q43 is turned off. This opens the circuit of motor 512 and prevents control signals from flowing into the motor circuit.

Figure 15A:
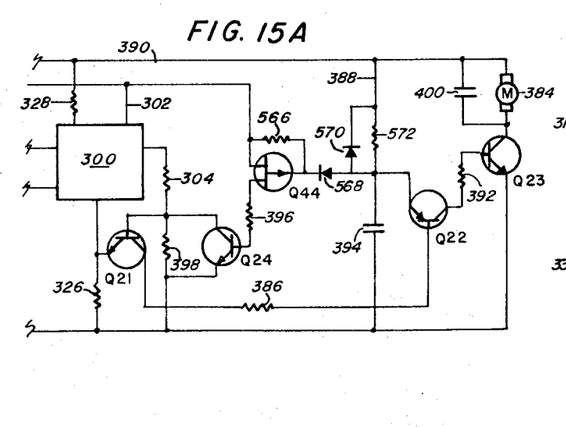

Although the on board drive motor control has been described with respect to a circuit that responds to the presence of control signals to disconnect the drive motor from the track, it will be apparent that a switching system can be devised which will respond to the presence of power signals to connect the drive motor to the track. Such a system is illustrated in FIG. 15A, wherein elements similar to those of FIG. 15 are similarly numbered. In FIG. 15A, capacitor 394 and resistor 572 form a frequency sensitive voltage divider wherein the low frequency power pulses on line 388 appear across capacitor 394. For high frequency control pulses, capacitor 394 is a low impedance and most of the voltage at 388 appears across resistor 572. The high voltage across 394 due to a power pulse is applied through diode 568 to the gate of field effect transistor Q44, to turn Q44 off. This, in turn, cuts off the normally-conductive transistor Q24 and permits transistor Q21 to be biased to conduction. When Q21 turns on, the motor circuit is connected to the track through Q23, as explained above. Diode 570 provides a discharge path for capacitor 394, diode 568 is a protective diode, and resistor 556 is a gate bleed resistor. Additional variations will be apparent to those skilled in the art.

Thus there has been described a system of supplying power and control signals to a remote vehicle through the medium of a conductive surface such as a track or raceway wherein power signals and control signals of various types may be used to drive and to control the operation of a remote vehicle such as a model car. As has been described the basic system consists of either a direct current or an alternating current power supply which is switched off during the period in which it is supplying the least power, and during this off time a control signal of any desired type is transmitted through the surface to the remote vehicle. Various alternative systems have been described above, it being understood that any desired combination of power supply and control signals may be used so long as an appropriately responding system is used in the receiving vehicles. Any practical number of vehicles may be controlled by this system, the use of the time-sharing concept providing a realistic operation of the remote vehicles without requiring the use of slots, rails or the like on the raceway surface. Although the foregoing specification sets forth the preferred embodiments of the present invention, various modifications will be apparent to those skilled in the art; it is therefore desired that the foregoing description be taken as illustrative and limited only by the following claims.

What is claimed is:

1. In a remote control system, a base unit having power supply means, means for producing gated power signals having periodic delay periods and means for generating control signals during said delay periods; means for transmitting said signals in a time-sharing arrangement; conductive track means for carrying said gated power and said control signals to a remote unit to be controlled; at least one remote unit in contact with said track means, each said remote unit comprising first means responsive only to said power signals, means for disconnecting said first means from said track means during transmission of said control signals, memory means for storing said control signals, and second means reponsive to said stored control signals to perform desired control functions in said remote unit.

2. The remote control system of claim 1, wherein said means for transmitting said signals in a time-sharing arrangement includes timing means in said base unit for energizing said control signal generating means in synchronization with said delay periods.

3. The remote control system of claim 2, wherein said control signal generating means includes a plurality of control signal generators, each of said generators corresponding to a function to be controlled in one of said remote units.

4. The remote control unit of claim 3, further including sequencing means in said base unit for selecting each of said control signal generators in a predetermined order, one of said generators producing a reset signal when selected to provide synchronization between said base and said remote units.

5. The remote control unit of claim 4, wherein said timing means in said base unit comprises a timer circuit responsive to said power supply means to produce a first periodic series of pulses, a trigger circuit responsive to each pulse of said first periodic series of pulses to produce a second pulse of predetermined duration, monostable network means switchable to an unstable state in response to each said second pulse to produce a third pulse of predetermined duration, said third pulse energizing said control signal generating means, whereby an output is obtained from said generating means only during said third pulse, said sequencing means in said base unit comprising a counting network responsive to the operation of said trigger circuit, and gating means associated with each of said generating means, the gating means of the selected generating means receiving said third pulse and the output of said counting network to effect connection of the output of the selected control signal generator to said track means.

6. The remote control system of claim 1, wherein said power supply means comprises a source of alternating current, said means for producing gated power pulses comprising first and second diode means blocking the flow of alternating current, first and second silicon controlled rectifiers connected in shunt with said first and second diodes, respectively, each of said rectifiers having a control electrode connected through a Zener diode to sense the amplitude of said alternating current, one Zener diode sensing each polarity of said alternating current, the breakdown point of said Zener diodes determining the time in each half-cycle of said alternating current source when said silicon controlled rectifiers become conductive to bypass one or the other of said first and second blocking diodes to produce output power pulses having a delay period between the end of one half-cycle of said alternating current source and the start of conduction of one of said rectifiers during the following half-cycle of said alternating current source.

7. The remote control system of claim 1, wherein said power supply means comprises a source of direct current, said means for producing gated power pulses comprising silicon controlled rectifier means blocking the flow of output current, said rectifier means having a control electrode connected through a Zener diode to sense the amplitude of said direct current, the breakdown point of said Zener diode determining the time when said silicon controlled rectifier becomes conductive, whereby a delay period is produced between the end of one power pulse and the beginning of conduction of said rectifier in the following power pulse.

8. The remote control system of claim 1, wherein said means for generating control signals includes a first, normally nonconductive, switching transistor and potentiometer means connected in series with said transistor, said potentiometer including a slidable arm from which said control signal is obtained during conduction of said first switching capacitor, the amplitude of said control signal being determined by the setting of said slidable arm, and means causing said first switching transistor to become conductive during one of said delay periods.

9. The remote control system of claim 1, wherein said means for generating control signals comprises oscillator means producing a signal of a predetermined frequency, amplifier means for applying said signal of predetermined frequency to a potentiometer and normally nonconductive switching means in series with the output of said amplifier means, said potentiometer including a slidable arm from which said control signal is obtained when said switching means is conductive, the amplitude of said control signal being determined by the setting of said slidable arm, and means causing said switching means to become conductive during one of said delay periods.

10. The remote control system of claim 1, wherein said conductive track means is a substantially smooth surface comprised of alternate conductive and insulating strips, said conductive strips being connected to said means for producing gated power signals and to said means for generating control signals, adjacent conductive strips being connected to opposite sides of said power and of said control signal means, said strips being arranged on said surface whereby said remote unit can receive said power and said control signals while moving in any direction on said surface.

11. The remote control system of claim 1, wherein said first means responsive only to said power signals comprises a drive motor for said remote unit for propelling said remote unit along said track, said remote unit including a plurality of contact means engaging said conductive track means for receiving said power and said control signals.

12. The remote control system of claim 11, wherein said means for disconnecting said drive motor from said track during transmission of said control signals comprises switching means connected to said drive motor for controlling the flow of said power signals to said motor, and means responsive to the occurrence of said control signals to operate said switching means.

13. The remote control system of claim 1, further including timing means in said remote unit synchronized with said signals transmitted from said base unit to open said memory means at predetermined times to admit said control signals thereto for storage.

14. The remote control system of claim 13, wherein said means for generating control signals includes reset signal generating means for synchronizing said remote unit timing means with said power and control signals transmitted by said base unit.

15. The remote control system of claim 13, wherein said timing means in said remote unit responds to said gated power signals for synchronization with the power and control signals transmitted from said base unit.

16. The remote control system of claim 1, wherein said memory means includes first semiconductor means having a load, control signal storage means for regulating the conductivity of said first semiconductor means and thus the current through said load, normally open first switch means connected across said storage means to provide a discharge path for said storage means upon closure of said switch means, and second switch means for opening said memory storage means to reception of said control signals.

17. The remote control system of claim 16, wherein said first semiconductor means is a field effect transistor, said storage means comprising a capacitor for storing a voltage proportional to the amplitude of the applied control signal, said first switch means comprising a low-leakage first transistor, said second switch means comprising a normally-conductive second transistor to shunt input control signals away from said storage capacitor, said remote unit further including timing means for cutting off said second transistor to permit selected control signals to be applied to said storage capacitor.

18. The remote control system of claim 11, wherein said second means responsive to said stored control signals includes a drive motor speed control circuit having means to regulate the flow of current through said drive motor.

19. The remote control system of claim 18, wherein said speed control circuit includes a first transistor in series with said drive motor and sensing means for sensing the amplitude of said stored control signals, the output of said sensing means being proportional to the amplitude of said stored control signals to control the conductivity of said first transistor in series with said drive motor.

20. The remote control system of claim 19, wherein said means for disconnecting said drive motor from said track during transmission of said control signals includes second transistor means responsive to the occurrence of said control signals to disable said sensing means, whereby said first transistor is cut off to open the circuit through said drive motor.

21. The remote control system of claim 1, wherein said second means responsive to said stored control signals includes a steering control circuit having means to control the position of a steering mechanism carried by said remote unit.

22. The remote control system of claim 21, wherein said means to control the position of a steering mechanism includes a reversible motor connected in a rebalanceable bridge circuit and means responsive to a change in the amplitude of the control signal stored in said memory circuit to unbalance said bridge and energize said motor, whereby said motor rotates to rebalance said bridge and to change the position of said steering mechanism.

23. The remote control system of claim 21, wherein said means to control the position of a steering mechanism includes a reversible motor connected in a rebalanceable follow-up circuit, said follow-up circuit having means responsive to the direction of change of said stored control signals to rotate said reversible motor and to rebalance said follow-up circuit.

24. The remote control system of claim 1, wherein said means for generating control signals includes a plurality of control signal generators, all operating at the same frequency and each being amplitude-modulated to provide a desired control function; said means for transmitting said signals in a time-sharing arrangement including timing means, trigger circuit means and monostable network means connected to synchronize the outputs of said control signal generators with the delay periods in said gated power signals; sequencing means for applying the output of one of said control signal generators at a time to said conductive track means; a plurality of vehicles operable on the surface of said track means, each of said vehicles carying one of said remote units, each remote unit corresponding to and responsive to specified ones of said control signal generators; contact means carried by each of said vehicles for receiving said time-shared power and control signals; said memory means of each of said remote units comprising memory circuits for receiving control signals from corresponding control signal generators through said contact means, each control signal generator and its corresponding memory circuit providing control of a specified control function; each of said vehicles carrying timing means for opening one of its memory circuits at a time in synchronism with the transmission of control signals from its corresponding control signal generator, whereby the output from each control signal generator is stored only in its corresponding remote memory circuit.

25. The remote control system of claim 1, wherein said means for generating control signals includes a plurality of control signal generators, each operating at a different frequency and each being amplitude-modulated to provide a desired control function; said means for transmitting said signals in a time-sharing arrangement including timing means, trigger circuit means and monostable network means connected to synchronize the outputs of said control signal generators with the delay periods in said gated power signals, all of said control signal generator outputs being transmitted during each said delay period; a plurality of vehicles operable on the surface of said track means, each of said vehicles carrying one of said remote units; contact means carried by each of said vehicles for receiving said time-shared power and control signals; said memory means for each of said vehicles comprising a memory circuit for each control function of said vehicle, each memory circuit corresponding to a specified one of said control signal generators, timing means carried by each of said vehicles for opening all its memory circuits during each of said delay periods, and tuned circuit means associated with each of said memory circuits to limit the response of the corresponding memory circuit to control signals of a single, predetermined frequency, whereby each memory circuit responds only to the output of its corresponding control signal generator.

26. The remote control system of claim 1 wherein said first means comprises a drive motor for said remote unit and said means for disconnecting said drive motor comprises switching means connected to said drive motor for controlling the flow of power signals thereto, and further including means responsive to the absence of said power signals to operate said switching means, whereby said drive motor remains connected to said track only during the occurrence of said power signals.

27. The remote control system of claim 1, wherein said remote units are model automobiles, said track means comprising a raceway on which said model automobiles can move in any direction, the outputs of said means for generating control signals being independently manually variable whereby the functions of said model automobiles are remotely controlled by said base unit.

References Cited
UNITED STATES PATENTS

| | | | |
|---|---|---|---|
| 3,205,618 | 9/1965 | Heytow | 46—244 |
| 3,339,307 | 9/1967 | Floyd et al. | 46—244 |

LOUIS G. MANCENE, *Primary Examiner.*

R. F. CUTTING, *Assistant Examiner.*